(12) United States Patent
Werner et al.

(10) Patent No.: US 9,616,621 B2
(45) Date of Patent: Apr. 11, 2017

(54) WHEEL MADE OF FIBER COMPOSITES AND PROCESS FOR THE MANUFACTURE THEREOF

(71) Applicant: THYSSENKRUPP CARBON COMPONENTS GMBH, Kesselsdorf (DE)

(72) Inventors: Jens Werner, Coswig (DE); Christian Köhler, Dresden (DE); André Bartsch, Dresden (DE); Sandro Mäke, Dohma (DE); Michael Dreβler, Dresden (DE); Martin Lepper, Dresden (DE); Werner Hufenbach, Dresden (DE)

(73) Assignee: THYSENNKRUPP CARBON COMPONENTS GMBH, Kesselsdorf (DE)

( * ) Notice: Subject to any disclaimer, the term of this patent is extended or adjusted under 35 U.S.C. 154(b) by 0 days.

(21) Appl. No.: 15/334,765

(22) Filed: Oct. 26, 2016

(65) Prior Publication Data

US 2017/0050392 A1   Feb. 23, 2017

Related U.S. Application Data

(62) Division of application No. 14/363,113, filed as application No. PCT/EP2012/074183 on Dec. 3, 2012.

(30) Foreign Application Priority Data

Dec. 7, 2011 (DE) .................. 10 2011 087 936

(51) Int. Cl.
| | | |
|---|---|---|
| *B29C 70/34* | (2006.01) | |
| *B60B 3/02* | (2006.01) | |
| *B60B 3/00* | (2006.01) | |
| *B60B 5/02* | (2006.01) | |
| *B60B 23/00* | (2006.01) | |

(Continued)

(52) U.S. Cl.
CPC ............ *B29C 70/34* (2013.01); *B29L 2031/32* (2013.01); *B60B 3/001* (2013.01); *B60B 3/02* (2013.01); *B60B 5/02* (2013.01); *B60B 21/023* (2013.01); *B60B 23/00* (2013.01); *B60B 2310/204* (2013.01); *B60B 2310/211* (2013.01); *B60B 2310/242* (2013.01); *B60B 2360/341* (2013.01);

(Continued)

(58) Field of Classification Search
CPC  B60B 3/02; B60B 5/02; B60B 21/104; B60B 21/106
See application file for complete search history.

(56) References Cited

U.S. PATENT DOCUMENTS

2006/0267396 A1* 11/2006 Baumgartner ....... B22D 15/005
                                                                     301/65
2010/0019564 A1*  1/2010 Theuer .................. B29C 70/347
                                                                    301/64.703

* cited by examiner

*Primary Examiner* — John Walters
*Assistant Examiner* — James Triggs
(74) *Attorney, Agent, or Firm* — McGlew and Tuttle, P.C.

(57) ABSTRACT

A one-part wheel which is made of fiber composites without interruption of fibers with excellent mechanical properties and with low weight at the same time as well as a process for the manufacture thereof. The wheel has especially a rim well as well as a wheel disk passing over into a wheel flange of the rim well, where the wheel disk is formed at least partly by fiber layers, which run from the rim well over a wheel flange and the wheel disk. The wheel is manufactured by a multipart mold with parts displaceable at least in the axial direction. The mold is completely removed after the deposition of fibers or remains as a lost core in the wheel.

20 Claims, 9 Drawing Sheets

(51) Int. Cl.
 *B60B 21/02* (2006.01)
 *B29L 31/32* (2006.01)
(52) U.S. Cl.
 CPC ... *B60B 2360/362* (2013.01); *B60B 2900/113* (2013.01); *B60B 2900/313* (2013.01)

WHEEL MADE OF FIBER COMPOSITES AND PROCESS FOR THE MANUFACTURE THEREOF

CROSS REFERENCE TO RELATED APPLICATIONS

This application is a divisional under 37 CFR 1.53(b) of pending prior application Ser. No. 14/363,113 filed Jun. 5, 2014, which is a United States National Phase Application of International Application PCT/EP2012/074183 and claims the benefit of priority under 35 U.S.C. §119 of German Patent Application DE 10 2011 087 936.6 filed Dec. 7, 2011, the entire contents of each application are incorporated herein by reference.

FIELD OF THE INVENTION

The invention pertains to a one-part wheel made of fiber composites without interruption of fibers as well as a process for the manufacture thereof.

BACKGROUND OF THE INVENTION

The use of lightweight materials in the manufacture of vehicles, especially in the manufacture of spare parts and performance parts, is known from the state of the art. The use of light metals, such as aluminum and magnesium, for body parts and small parts has become generally accepted not only in racing or for small series, but also meanwhile in products for the mass public. In addition, because of their excellent ratio of weight to mechanical properties, fiber composites have lately been gaining increasing significance.

So that a component made of fiber-reinforced plastic can optimally absorb multiple stresses acting on it, it should also contain reinforcing fibers with multiple orientations, since they can absorb these forces, especially lengthwise. In addition, components made of fiber-reinforced plastic, which consist of continuous fiber layers, which ideally pass through the entire component, have proven to be successful.

In components which have complicated shapes and are highly stressed, such as, e.g., wheels, these requirements on the inner structure of fiber-reinforced components were usually not met up to now. This is the result of the fact that no process for the manufacture of a wheel, which can deposit continuous fibers corresponding to the geometry of a wheel, is known from the state of the art.

Therefore, in the state of the art, particularly processes for the manufacture of wheels are found in injection molding, wherein only very short reinforcing fibers are used in favor of the formability of the components. Another possibility is for the wheels to have a multipart design, whereby the simple geometry of the individual parts permits the construction thereof from long-fiber-reinforced plastics.

A vehicle wheel made of fiber-reinforced plastic as well as a process for the manufacture thereof is described in U.S. Pat. No. 3,917,352 A. In this case, the wheel has a one-part design and comprises both a rim well and a wheel disk. The wheel is manufactured by winding a fabric tube around the two halves of a mold, whereby the wheel disk can be formed by means of winding around a groove. Deposition of fibers during the winding does not, however, take place sufficiently in a positive-locking manner; hence, the fabric tube must be additionally wound around with fabric tape or filaments. A forming of the wheel disk already during the deposition of the fiber layers is not disclosed.

The subject of DE 42 23 290 B4 is a composite synthetic resin wheel, which consists of a plurality of partial cast parts and its wheel disk passes directly over into one of the wheel flanges. The partial cast parts have a corresponding threaded section on their connecting surfaces, such that they can be joined together by means of a screw connection. Each of the individual partial cast parts consists of short-fiber-reinforced plastic, as a result of which the construction of such a rim from continuous fibers without interruption of fibers according to the disclosure of this publication is not possible. Because of the structure of the composite synthetic resin wheel, mechanical weak points must be taken into account especially at the connecting points of the partial cast parts.

DE 100 06 400 A1 discloses a disk wheel consisting of fiber-reinforced plastic at least in sections as well as a process for the manufacture thereof. In this case, the disk wheel preferably consists of a metallic rim well as well as a rim well consisting at least partly of unidirectional fiber SMC (sheet molding compound). The wheel disk and rim well are connected with one another in substance or in a positive-locking manner or by means of fastening means having a different action. In the preferred case of positive locking, the wheel disk has a plurality of pin-like projections that correspond with a plurality of holes in the rim well. Such fastening means can be constructed with fiber reinforcement only with great difficulty and hence frequently have low fiber volume percentages. Hence, reduced mechanical properties of the disclosed disk wheel compared to components constructed from fiber composites in one part had to have been assumed. Such a one-part design of a disk wheel is not described in the publication.

U.S. Pat. No. 4,721,342 A discloses a fiber-reinforced plastic wheel with an essentially three-part design. In particular, the wheel disk, consisting of fiber material, of the wheel is constructed separately and is connected in substance to the inner two hollow-cylinder-like layers of fiber material. By means of connecting the two hollow-cylinder-like fiber layers and the fiber layer forming the wheel disk first in the consolidation process, an expensive fixing of the fiber layers to one another is guaranteed during the deposition of fibers. Furthermore, reduced mechanical properties at the connection points of the individual parts compared to the rest of the component must be assumed.

An essentially two-part fiber-reinforced vehicle wheel made of composite is disclosed in US 2005/0104441 A1. The vehicle wheel consists of a fiber-reinforced rim well as well as a fiber-reinforced wheel disk, which are connected with one another in substance and in a positive-locking manner wherever possible first in the consolidation process. Thus, there is also no fiber reinforcement of the rim in the disclosed wheel precisely in the especially stressed area of the transition from the wheel disk to the rim well. According to the publication, the preforms for the rim well and the wheel disk are always prepared isolated from one another; thus, a vehicle wheel with a one-part design without interruption of fibers is not disclosed in this publication.

A light metal wheel, in which the wheel disk passes over into the outer wheel flange, is disclosed in DE 10 2004 028 841 A1 and in DE 103 02997 A1. Furthermore, the wheel may have a cavity in the undercut area of the outer wheel flange, as a result of which an especially good stability should be obtained. The design of such a wheel made of fiber composite is not disclosed in the publication.

SUMMARY OF THE INVENTION

An object of the present invention is to overcome the drawbacks of the state of the art and provide a wheel made of fiber composite, which has excellent mechanical properties with low weight at the same time, and which is simple and cost-effective to manufacture.

The object of the present invention is accomplished by the features of the present invention.

The wheel according to the present invention advantageously has a shape, which corresponds to the greatest extent to the shape of usual wheels of motor vehicles. For the mounting of tires, the wheel has a rim well, which is defined by wheel flanges on both sides. Corresponding to the orientation of the rim in the state mounted on the motor vehicle, a distinction is made between the outer wheel flange on the side facing away from the vehicle and the inner wheel flange on the side facing the vehicle. Since double tires of utility vehicles are, however, frequently formed from wheels, whose wheel disks are facing each other, the designation of first and second wheel flanges is used below as an alternative. Between the wheel flanges, the rim well has a well, in whose area the wheel has a smaller circumference than at the wheel flanges. The center between the wheel flanges is designated as the rim center. The well itself may have other designs, e.g., a hump or rim shoulder, which are of secondary importance for the present invention, however.

The wheel according to the present invention advantageously has a shape, which corresponds to the greatest extent to the shape of usual wheels of motor vehicles. For the mounting of tires, the wheel has a rim well, which is defined by wheel flanges on both sides. Corresponding to the orientation of the rim in the state mounted on the motor vehicle, a distinction is made between the outer wheel flange on the side facing away from the vehicle and the inner wheel flange on the side facing the vehicle. Since double tires of utility vehicles are, however, frequently formed from wheels, whose wheel disks are facing each other, the designation of first and second wheel flanges is used below as an alternative. Between the wheel flanges, the rim well has a well, in whose area the wheel has a smaller circumference than at the wheel flanges. The center between the wheel flanges is designated as the rim center. The well itself may have other designs, e.g., a hump or rim shoulder, which are of secondary importance for the present invention, however.

In addition, the wheel according to the present invention has a wheel disk, which is used to connect the wheel to the wheel hub or to the wheel suspension. As an alternative, the wheel disk may also be formed only by means of a flange, to which it is fastened especially in a positive-locking manner by means of bolt connections or even by means of a toothed integration of an inner wheel disk element (which may also be formed by means of a wheel spider or wheel rim, among other things). In this case, the inner wheel disk or wheel spider would then establish the connection to the wheel hub or wheel suspension. Accordingly, the wheel disk represents a connecting surface, which extends radially from the axle or wheel hub, to the hollow-cylinder-like rim well, at which it is positioned at an angle. This may be a right, acute or obtuse angle. In addition, the wheel disk may have a contoured shape, both for aesthetic and for functional reasons, especially an increase in strength.

Furthermore, the wheel disk is preferably designed as a wheel spider, whereby the radially extended connecting surface has openings, e.g., so that a defined number of spokes represent the connections between the wheel hub and the rim well.

In the wheel according to the present invention, the wheel disk passes over into a wheel flange, as a result of which the hollow cylinder formed by the rim well has a one-sided top surface. The wheel disk is positioned at the axially outermost point of the rim well, the wheel flange, and from there runs radially inwards in the direction of the axis of rotation of the rim well or wheel.

According to the present invention, the wheel is made of fiber composite, which has reinforcing fibers embedded in duro- or thermoplastic matrix material. Carbon, fiberglass or aramid fibers are preferably used as reinforcing fibers.

The wheel, i.e., the wheel disk and rim well, has a one-part design made of fiber composite. In this case, the reinforcing fibers are preferably arranged as continuous fibers in the form of layers in fiber layers in the wheel disk and the rim well, and at least some of the number of fibers run between the wheel disk and the rim well without interruption. Since the fiber layers are preferably formed from continuous fibers, the fiber layers pass over into one another at reversal points, whereby a reversal of direction of at least some of the fibers takes place. The reversal points are preferably located on the periphery of the one-part rim, i.e., on the one hand, on the wheel flange, and, on the other hand, on the inner limitation of the wheel disk, which is the so-called wheel hub hole. Advantageously, the fiber layers have an increased stability at these reversal points in the consolidated state, as a result of which a special strength of the wheel at the especially stressed areas, for example, the wheel connection and wheel flanges, is advantageously achieved.

For the purpose of a local reinforcement, reversals and thus connected passages of the fiber layers into one another may also be provided in other areas of the rim or of the wheel disk.

Thus, the fiber layers preferably run at least partly without interruption from the rim well, over one, especially the outer, wheel flange into the wheel disk. The term "partly" describes here that not all fiber layers, but rather at least one such fiber layer runs. There may also be fiber layers that run only in the rim well or only in the wheel disk.

Depending on the manufacturing process, the fiber layers may consist of braiding, fabric, mesh, or scrim. Especially preferably, the fiber layers are made of braided continuous fibers.

In addition, in the manufacture of a wheel disk formed as a wheel spider, one or more layers may be deposited only on parts of the circumference of the wheel. These fiber layers, which are deposited incompletely in various areas along the circumference, form separate, arc-like connections between the rim well and the wheel hub. These fiber layers are especially preferably textile patches or scrim.

Since the fiber layers, preferably at least some of their number, run without interruption between the rim well and wheel disk, these also have a change in their extension or orientation in the area of the wheel flange, to which the wheel disk is connected. The fiber layers are oriented in a rotationally symmetric pattern about the axis of rotation defined by the wheel hub in the area of the rim well as an outer radial limitation or jacket surface of a hollow cylinder. They preferably form a plurality of layers arranged radially one on top of the other. The fiber layers are essentially arranged one on top of the other in the axial direction in the area of the wheel disk. Essentially here means that bulges, structurings or slopes up to 15° from the plane, in which the connecting wheel flange lies, may occur for reasons of optical design or improved absorption of forces. To make possible the different orientation of the fiber layers in the rim well and the wheel disk, at least some of the fiber layers are bent over radially inwards in the area of the connecting wheel flange.

Due to the construction of the rim well and wheel disk from at least partly shared continuous fibers, a wheel with a wheel disk connected with high strength, in which the forces and torques acting on the wheel disk are optimally transmitted to the rim well, is thus advantageously formed. Thus, the wheel has a higher stability compared to a multipart rim design especially in the connection area of the wheel disk to the rim well. Since the fibers according to the present invention are bent over radially inwards at the axially outermost point of the rim well, the change in orientation of the fiber layers takes place in the area of the wheel flange. In order to fulfill its function, which is the lateral stabilization of the tire on the rim well, this wheel flange has a greater radial extension than the rim well. In order to achieve this change in circumference, the fiber layers of the rim well are oriented preferably in an almost radial direction outwards at the axially inwards directed flank of this wheel flange. Due to the bending over of the fiber layers radially inwards in the area of the wheel disk, a reversal of the orientation of the fibers also takes place at this wheel flange, but without fiber layers deposited on one another passing over into one another. Advantageously, the fiber layers also have an increased stability at this reversal point in the consolidated state, as a result of which an increased strength is also achieved at the highly stressed wheel flange.

Furthermore, the design of the fiber layers bent over radially inwards as a flange for fastening to the inner wheel disk or to a wheel rim is preferred. For this, the fiber layers bent over radially inwards have a shorter extension in the radial direction than in the design of a complete wheel disk. Thus, the fiber layers form an edge oriented predominantly radially inwards, which is positioned at the wheel flange. Especially preferably, the flange has means for fastening the wheel disk or the wheel spider. These means are either integrated in the flange already during the manufacturing process or inserted after the consolidation of the rim, e.g., through a hole.

The fiber layers bent over radially inwards are preferably arranged, such that the wheel disk formed from them is present either circumferentially, i.e., as a full disk in the proper sense, or in the form of individual circular disk segments, i.e., as a wheel spider. In the case of the individual circular disk segments, these are especially preferably formed differently, both as concerns their width and their radial extension.

In the design of the fiber layers bent over (radially) inwards as a wheel spider in the form of arc-like connections between the rim well and the wheel hub or wheel suspension, the fiber layers have, in the radially inwards extended plane of the wheel disk, openings, which extend in the radial direction maximally from the wheel flange to the wheel hub or the wheel suspension. In addition, the openings may have any dimensions vertically to the radial direction as long as a sufficiently stable connection between the rim well and the wheel hub is still formed by the fiber layers bent over radially inwards.

The orientation of the continuous fibers within the individual fiber layers may vary between different fiber layers. Preferably, the continuous fibers in the fiber layers in the area of the rim well have a different angle in relation to the axial direction of the wheel than the continuous fibers in the area of the wheel disk in relation to the radial direction of the wheel. Here, the orientation of the fibers in the rim well is, above all, determined by the desired mechanical properties of the rim well. The orientation of the continuous fibers in the area of the fiber layers bent over radially inwards is used for preparing a high-strength wheel disk with an optimal transmission of forces to the rim well.

The continuous fibers of the fiber layers in the area of the rim well have a fiber angle of 0° to ±90°, preferably ±3° to ±87° and more preferably ±30° to ±70° in relation to the axial direction of the rim. When using suitable textile semifinished products, e.g., unidirectional tubes or braiding with filler yarn (with a fiber angle 0° in relation to the axial direction of the wheel), the angles of the continuous fibers in relation to the axial direction of the wheel may advantageously be ±0° to ±90°. A variation of the angle of the continuous fibers in different fiber layers of the rim well is especially preferable, since a better resistance to changing stresses is thus advantageously achieved. Thus, the fiber layers, whose fibers are oriented almost parallel to the axial direction of the wheel, can absorb impact stresses acting laterally on the wheel flanges, in particular. Fiber layers, whose continuous fibers are oriented almost vertically to the axial direction of the wheel, may advantageously absorb torsional forces occurring during acceleration or braking processes.

The continuous fibers of the fiber layers in the area of the wheel disk have a fiber angle of ±3° to ±87°, preferably ±10° to ±80°, more preferably ±20° to ±75° and more preferably ±30° to ±70° in relation to the radial direction of the wheel. When using textile semifinished products, the angles of the continuous fibers relative to the radial direction of the rim may also be from ±0° to ±90°. The transmission of torques from the hub to the tire stresses the wheels less than the impact stresses that occur during the driving through potholes or unevennesses. Due to an alignment of fibers almost in the radial direction of the wheel, these pulse-like stresses may be transmitted especially well via the wheel disk to the hub or wheel suspension. An even better stability of the wheel is preferably achieved by the fibers of different fiber layers having different orientations from one another.

Furthermore, the running of the fibers in the individual layers of the rim well according to the present invention is preferably adapted corresponding to the mechanical stresses to be expected. The adaptation here takes place primarily by setting the orientation of the fibers, by adapting the layer thickness as well as optionally by inserting an additional textile inlay between the fibers layers at especially stressed points according to expectations. Furthermore, a reinforced fiber deposition in certain areas of the rim well or of the wheel disk can take place due to the setting of the position of the reversal points of the fiber deposition.

The wheel disk of the wheel according to the present invention has a section for fastening the wheel to the wheel hub in an especially preferred embodiment. This section may be characterized by a special orientation of fiber layers in relation to the radial direction of the wheel, e.g., in a centering surface. Furthermore, the section may contain fastening means, e.g., bolt holes or a central closure.

Furthermore, the wheel according to the present invention preferably has at least a completely or partly circumferential cavity in the axial area between the wheel flange connecting to the wheel disk and the rim well, especially the well, or in the undercut area of the wheel flange connecting to the wheel disk. This cavity is preferably entirely defined by fiber layers, whereby especially preferably the axially outer limitation of the cavity is formed by the wheel disk, the radially inner limitation of the cavity passes over into the rim well, especially the well, and the radially outer limitation of the cavity is formed by the profile of the rim well from the wheel flange in the direction towards the rim center, and in particular, up to the well. If the cavity is only partly circumferential, then additional limitations are located between the individual cavities. Such a design of the cavity advantageously leads to an increase in strength in the area of the hollow profile and low remaining weight at the same time. Furthermore, the fiber layer defining the cavity radially inside represents an additional connection of the rim wheel and the wheel disk. Since the continuous fibers here do not experience an almost full reversal of direction, this connection leads advantageously to a better transmission of forces between the wheel disk and the rim well.

Furthermore, at least one entirely or partly circumferential lost core is preferably integrated in the undercut area of the wheel flange connecting to the wheel disk. Like the cavity already described, this lost core may be defined entirely or else only partly by fibers layers. If the at least one lost core is partly defined by fiber layers, the axially outer limitation of the cavity is formed by means of the wheel disk and the radially outer limitation of the cavity is formed by means of the profile of the rim well from the wheel flange connecting to the wheel disk in the direction of the rim center, and especially up to the well. The adhesion of the lost core is then achieved by means of a positive-locking connection or by means of connection in substance, e.g., by means of using an adhesive or by means of consolidation. If an only partly circumferential core is integrated, additional limitations may be located between the individual core segments. The lost core preferably consists of plastic, foamed plastic or metallic materials. Due to the integration of a lost core, the strength of the rim is advantageously increased in the area of the wheel flange connecting to the wheel disk. In the design of the fiber layers bent over radially inwards as a flange, means for fastening the wheel disk or the wheel spider are preferably integrated in the core.

Furthermore, the subject of the present invention is a process for the manufacture of a wheel made of fiber composite.

According to the present invention, a multipart core mold is used here. This multipart core mold comprises a cylinder-like rim well core, whose radial limiting surface corresponds to the contour of the rim well of the rim to be manufactured. In addition, an axial limiting surface of the rim well core corresponds to the contour of the wheel disk of the wheel to be manufactured. An auxiliary core, which is displaceable in the axial direction, especially along the rotation symmetry axis of the core mold, and approximately ends with the rim well core in the radial direction, which auxiliary core is detachably connected with the rim well core, is connected to the rim well core at this axial limiting surface.

At least one layer of fiber material is deposited on this core mold, such that the fibers are deposited in a positive-locking manner on the circumference of the core mold and in the axial direction on the rim well core and the auxiliary core. Consequently, the radial limiting surface of the core mold is surrounded by fiber material in a tube-like manner. The fiber material is deposited on the core mold in the process according to the present invention by means of draping multiaxial scrim, scrim cuts or fabric layers on the core mold, by winding around the core mold with tape braid or flat-pressed round braid and/or by braiding the core mold with braided filament.

After the deposition of the fibers on the multipart core mold, the auxiliary core is removed from the rim well core, and in particular displaced in the axial direction facing away from the rim well core, whereby this movement of the auxiliary core takes place until this is completely extracted from the fiber material deposited in a tube-like manner on the auxiliary core. Consequently, an end of the tube-shaped fiber material, projecting over the rim well core, is formed.

In a next process step, the fiber material deposited beforehand on the auxiliary core is bent over in the radial direction inwards and is formed in one piece with the axial limiting surface of the rim well core. Consequently, the positive-locking deposition of continuous fibers takes place, which also lie in a positive-locking manner on the radial limiting surface of the rim well core, on its face, imaging the contour of the wheel disk. Thus, a fiber preform made of continuous fibers, which is formed in one piece with the rim well core in a positive-locking manner, which has the contour of the rim to be manufactured, comprising the rim well and the wheel disk, is created.

In a likewise preferred embodiment of the process, the fiber material is deposited only in the area of the rim well core along its entire circumference. On the other hand, in the area of the auxiliary core, fiber layers are deposited incompletely along the circumference of the rim well core. By means of bending over these incompletely deposited fiber layers radially inwards, a wheel disk designed as a wheel spider is produced. Textile patches or scrim are preferably used in the incomplete deposition of fiber layers along the circumference of the rim well core.

For the manufacture of the actual wheel made of fiber composite, the fiber preform deposited on the rim well core is inserted into a multipart, preferably metallic outer mold. Once the preform has been inserted, the outer mold is closed, and the fiber material is consolidated with duro- or thermoplastic matrix material. In this case, the matrix material is preferably injected into the mold with a defined pressure and a defined temperature. In the mold, the fiber composite is consolidated by binding the matrix material and fiber preform, preferably under defined pressure-temperature conditions, during a defined period. After the curing of the matrix material, the finished wheel, comprising the rim well and wheel disk formed in one piece therewith, is removed from the outer mold. The parameters of pressure and temperature actually to be used in the consolidation depend on the materials used. Since these materials are from the state of the art, these parameters are known to the person skilled in the art.

In a preferred embodiment, a thermo- or duroplastic binder is added to the fibers during deposition of the fibers. This may take place, for example, in the powder form, but also by using impregnated fibers. After the fiber deposition, the fiber preform is subsequently pre-consolidated. In the preferred use of thermoplastic binders, this can be carried out, for example, in a technologically simple and cost-effective manner with a hot air blower. After pre-consolidation, the core mold may then be removed from the fiber preform. At a later point in time, the fiber preform is then inserted into the consolidation mold and the wheel is then consolidated. This procedure offers a plurality of advantages. Thus, only a markedly lower number of very cost-intensive core molds have to be kept on hand within the framework of series production. Due to the lower necessary number of sealing lines at the consolidation mold compared to inserting the preform with the core mold, this has a markedly simpler design and therefore is also cost-effective. Not least, an uncoupling of the fiber deposition and the consolidation can be achieved in this embodiment.

In an alternative embodiment of the process, the fiber preform with the core mold is inserted into the consolidation mold. In this embodiment, an addition of a binder is advantageously not necessary during the fiber deposition.

An RTM, Resin Transfer Molding, a mold made of plastic or preferably made of metal materials, is preferably used in the process according to the present invention. The matrix material is preferably injected via one or more resin injection ports, which are preferably arranged in lumps, linearly or in a channel-shaped manner in the mold.

In a preferred embodiment of the process according to the present invention, the bending over and forming in one piece of the tube-shaped fiber material takes place on the axial limiting surface of the rim well core by means of the auxiliary core. In this case, this auxiliary core, after it was moved out of the tube-shaped fiber material deposited thereon in the axial direction, is again moved axially back in the direction of the rim well core. By means of the axial limiting surface of the auxiliary core, the continuous fibers are consequently formed in one piece with the axial limiting surface of the rim well core. In this case, the axial limiting surfaces of the rim well core and auxiliary core, which are directed toward each other, are preferably designed as ideally shaped counterparts in order to thus advantageously make possible an especially positive-locking and uniform fiber position with as few air pockets as possible. Likewise preferable is a special design of the radial limiting surface of the auxiliary core, as a result of which a deposition of fiber material already adapted to the desired geometry of the wheel disk is advantageously carried out. With a solid auxiliary core, a reduction of the circumference is hence only possible in the direction facing away from the rim well core, since, otherwise, the extraction of the auxiliary core from the fiber material cannot be carried out in this direction.

Also preferably, the auxiliary core is designed such that its volume can be set in a variable manner. Consequently, a reduction of the circumference of the auxiliary core is also possible in the direction facing away from the rim well core. If an auxiliary core has such a form in the deposition of the fiber material, then its volume is suitably reduced before the extraction from the tube-shaped fiber material. Such an auxiliary core preferably has a conical contour tapering in the direction facing away from the rim well core. As a result, less fiber material is advantageously deposited along this direction, which advantageously brings about a reduced formation of folds of the fiber material during the bending over and forming in one piece of the fiber material on the axial limiting surface of the rim well core. In addition, the radial limiting surface especially preferably has a gradual reduction of the circumference in the direction facing away from the rim well core. This advantageously makes possible the especially positive-locking forming in one piece of the fibers with the axial limiting surface of the rim well core, imaging a centering surface of the wheel disk. Such an auxiliary core is preferably inflatable for controllable change in its volume or designed as fillable with a fluid or designed as elastic and stabilizable.

Furthermore, the rim well core itself also preferably has a multipart, especially two-part design and especially consists of a first and a second part. Here, the first part of the rim well core images the profile of the rim well of the rim to be manufactured in the area of the wheel flange not connecting to the wheel disk and of the well. The second part of the rim well core then images the profile of the rim well in the undercut area of the wheel flange connecting to the wheel disk, i.e., especially from this wheel flange up to the beginning of the well. Both parts of the rim well core are here preferably designed as positive-locking with one another and detachably connectable with one another. In particular, the second part of the rim well core can be pushed or pressed onto the first part of the rim well core in the form of a circular ring or can be mounted on same in the form of individual circle segments. Especially preferably, the first part of the rim well core has, for this, a mounting surface, especially preferably fastening means, for the second part of the rim well core and thus extends, like a one-part rim well core, over the entire width of the rim well of the wheel to be manufactured in the axial direction. In the area of the mounting surface of the second part, the first part of the rim well core especially preferably has a similar circumference as in the area of the well and/or an outer shape which is approximately cylindrical and unprofiled aside from fastening means for the second part of the rim well core.

The multipart or two-part design of the rim well core consisting of parts, which can be detachably connected with one another, advantageously guarantees, among other things, the removability of the rim well core from the fiber preform in the process according to the present invention. Because of the one-part design of the wheel to be manufactured, one side of the wheel is closed at least partly with the wheel disk. Thus, the rim well core can be removed only from the opposite side. However, this is made difficult or impossible in a one-part design of the rim well core through the undercut area of the wheel flange connecting to the wheel disk. On the other hand, in a two-part design of the rim well core, the first part of the rim well core is first removed from the fiber preform in the axial direction. Consequently, the second part of the rim well core can be removed from the undercut area of the wheel flange in the radial direction and can then be easily removed from the fiber preform in the axial direction.

To make the removability of the rim well core from the fiber preform possible, further embodiments of a one-part or multipart rim well core are preferred. This rim well core is preferably designed as segmented, whereby especially preferably the segments forming the second part of the rim well core can be sunk in the first part of the rim well core. Also preferred is an inflatable embodiment of the rim well core, especially of the second part in a two-part design, or the fillability of the core with a fluid. This also advantageously makes possible the removability of the rim well core, in which after the deposition of the fiber material its volume is reduced. In addition, also preferred is a rim well core, which is designed as elastic and stabilizable and, e.g., consists of an elastic outer core, e.g., of elastic plastic, which is stabilized by sufficiently pushing in the first part of the rim well core for the deposition of fibers. Furthermore, the removability of the rim well core can advantageously be made possible, when the second part of the rim well core is applied, especially in a material-related manner, such that it remains as a lost core in the rim or can be shrunk or dissolved due to the action of a medium or heat.

In an especially preferred embodiment, the process according to the present invention is carried out at first only using a core mold, consisting of the auxiliary core and the first part of the rim well core. In this case, an auxiliary core, which approximately ends with the first part of the rim well core in the radial direction, especially at the level of the well, is especially preferably used. Consequently, as already described, the bending over and positive-locking forming in one piece of the deposited fiber material with the axial limiting surface, imaging the profile of the wheel disk, of the first part of the rim well core. Then, the second part of the rim well core is fastened to the first part of the rim well core and the fiber layers deposited thereon, such that it ends with these on their axial outer limiting surface. Especially preferably, a circular ring, which is pushed onto the first part of the rim well core, is used as the second part of the rim well core. For this, the first part of the rim well core is preferably slightly conical at its outer end, and the second part of the rim well core is designed as an ideally shaped counterpart, in order to make possible the pushing on of the second part of the rim well core up to a defined point. Once the second part of the rim well core has been attached, fiber material is again deposited on this rim well core as well as on an auxiliary core according to the process according to the present invention. In this case, an auxiliary core, which ends in the radial direction with the second part of the core, especially at the level of the wheel flange connecting with the wheel disk, is preferably used. This advantageously makes possible the bending over and positive-locking forming in one piece of the deposited fiber material with the axial limiting surface, imaging the profile of the wheel disk, of the second part of the rim well core, as well as the fiber layers already deposited on the first part of the core. After the deposition as well as forming of the fiber layers, the first part of the rim well core can be removed in the axial direction from the fiber preform without problems, before this fiber preform is then consolidated in a multipart outer mold. The second part of the rim well core preferably remains as a lost core in the rim or is dissolved due to the action of a medium, and the material is then preferably let out via openings in the preform provided for this. Thus, a cavity filled with the lost core or unfilled is advantageously formed in the area of the wheel flange connecting to the wheel disk and of the rim well, which brings about an advantageous increase in the strength of the rim in this area.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
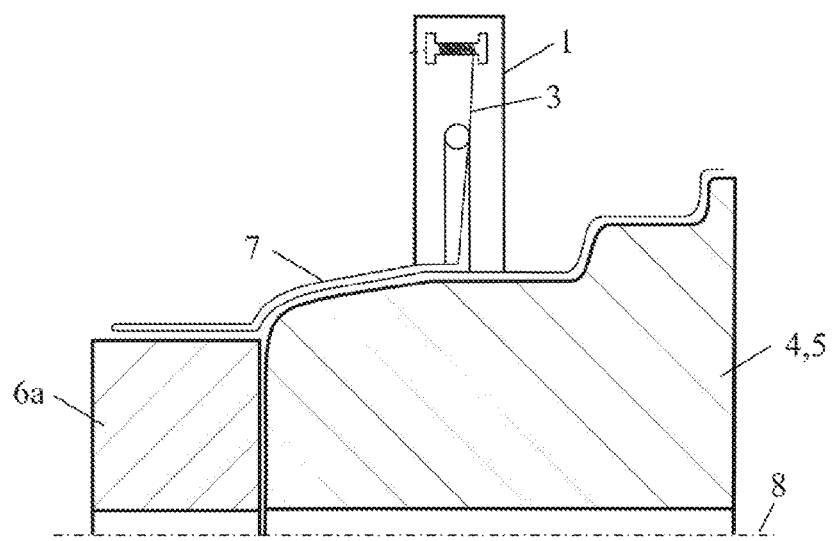
FIG. 1 is a view of the deposition of a first layer of fiber material on a multipart core mold, consisting of an inner rim well core and a first cylindrical auxiliary core by means of a radial braiding machine.
Figure 2:
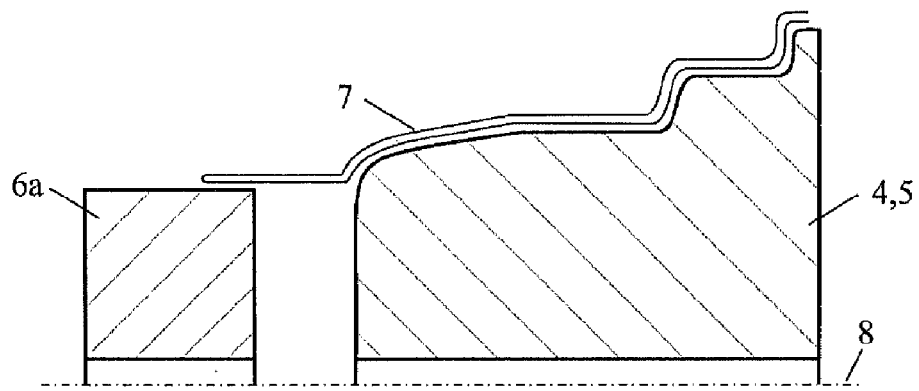
FIG. 2 is a view of the axial extraction of the first cylindrical auxiliary core from the tube-shaped fiber material deposited thereon.
Figure 3:
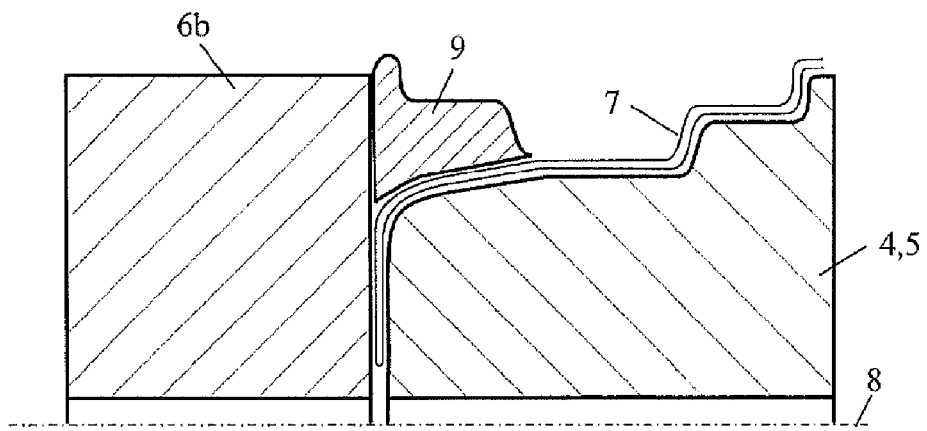
FIG. 3 is a view of the inner rim well core with a first layer of fiber material deposited thereon in a positive-locking manner and formed in one piece therewith, as well as the outer rim well core which is mounted on these fiber layers and the inner core.
Figure 4:
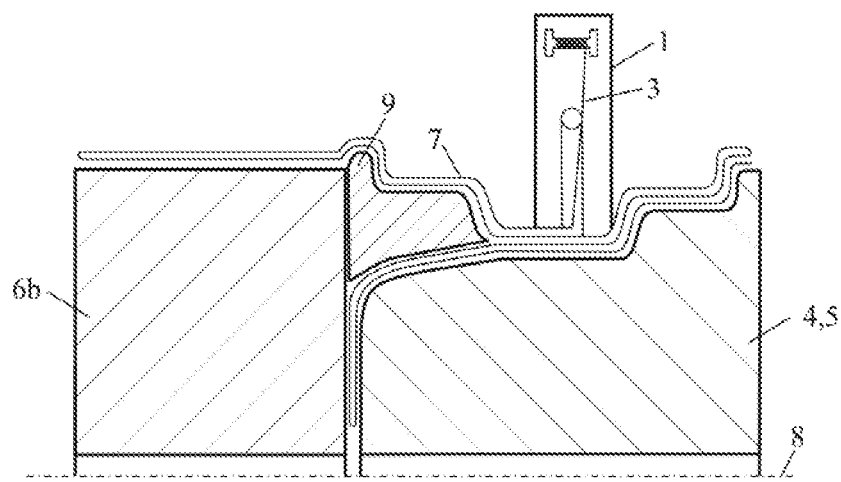
FIG. 4 is a view of the deposition of a second layer of fiber material on a multipart core mold, consisting of an inner and an outer rim well core as well as a second cylindrical auxiliary core by means of a radial braiding machine.
Figure 5:
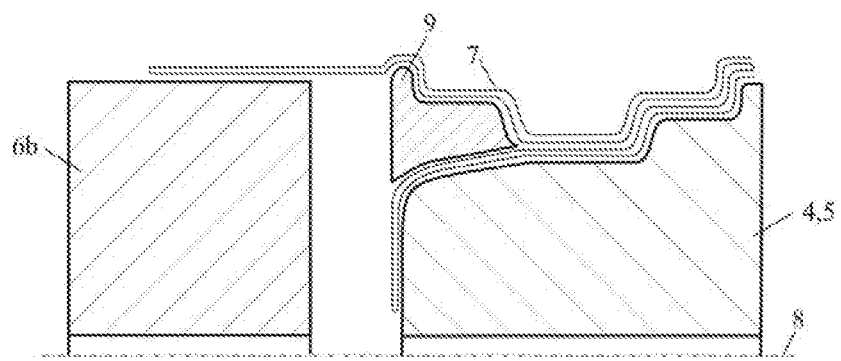
FIG. 5 is a view of the axial extraction of the second cylindrical auxiliary core from the tube-shaped fiber material deposited thereon.
Figure 6:
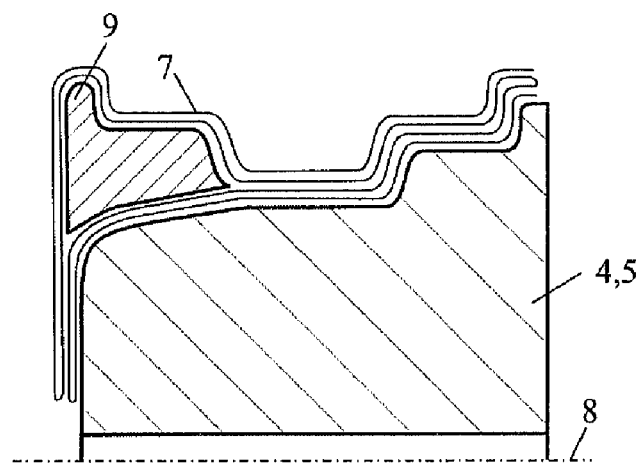
FIG. 6 is a view of the inner rim well core with a first layer of fiber material deposited thereon in a positive-locking manner and formed in one piece therewith, as well as the outer rim well core which is mounted on this fiber material and the inner core with a second layer of fiber material deposited thereon in a positive-locking manner and formed in one piece therewith.
Figure 7:
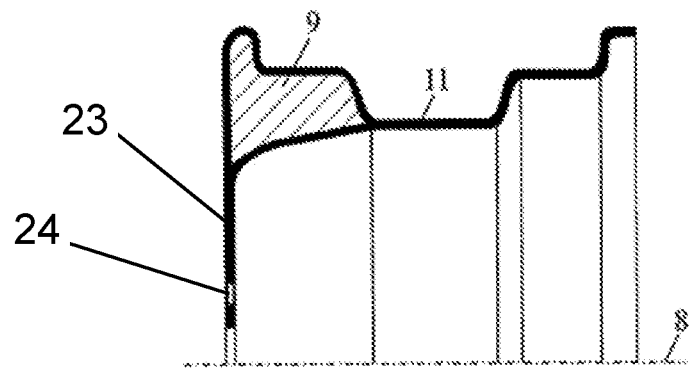
FIG. 7 is a cross sectional view of a rim profile, comprising a rim well and a wheel disk, with a lost core located in the area of the outer wheel flange, enclosed by fiber material.
Figure 8:
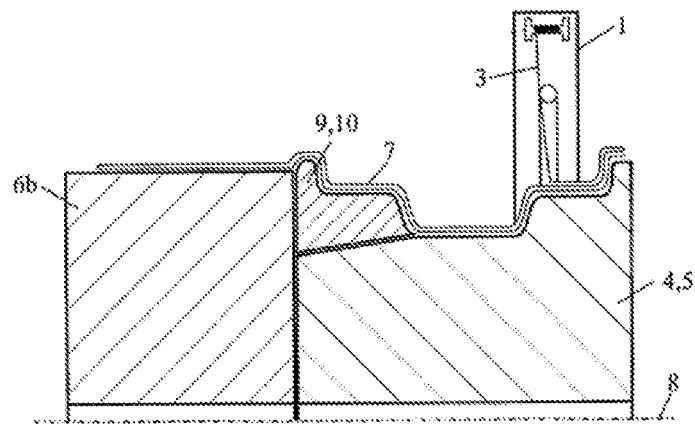
FIG. 8 is a view of the deposition of a first layer of fiber material on a multipart core mold, consisting of an inner and an outer rim well core and a cylindrical auxiliary core by means of a radial braiding machine.
Figure 9:
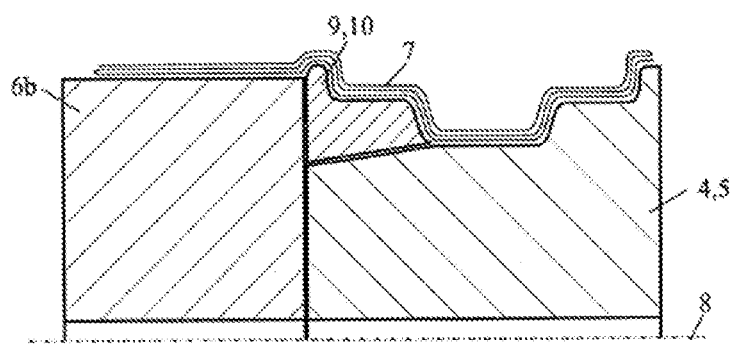
FIG. 9 is a view of the deposition of a second layer of fiber material on a multipart core mold, consisting of an inner and an outer rim well core and a cylindrical auxiliary core by means of a radial braiding machine.
Figure 10:
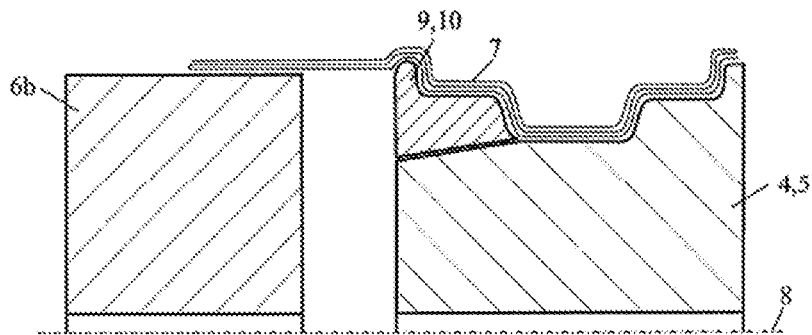
FIG. 10 is a view of the axial extraction of the cylindrical auxiliary core from the tube-shaped fiber material deposited thereon.
Figure 11:
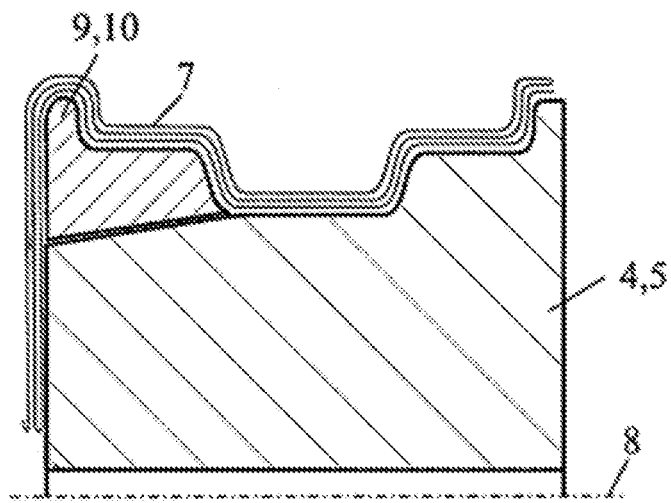
FIG. 11 is a view of the inner and outer rim well core with fiber material deposited thereon in a positive-locking manner and formed in one piece therewith.
Figures 12, 13:
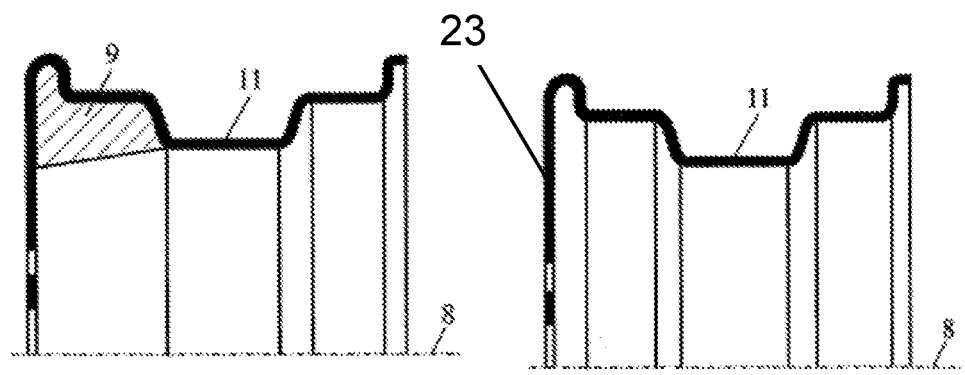
FIG. 12 is a cross sectional view of a rim profile, comprising a rim well and a wheel disk, with a lost core located in the area of the outer wheel flange.
FIG. 13 is a cross sectional view of a rim profile, comprising a rim well and a wheel disk.

In the first exemplary embodiment shown in FIGS. 1, 2, 3, 4, 5, 6 and 7, the wheel disk (23) is formed by means of the braiding of cylindrical mold parts, which have different diameters and which are used as auxiliary cores (6a, 6b). For this, at first the auxiliary core (6a) is mounted in the area of the well of the rim well core (4, 5). After the braiding of the auxiliary core (6a) with a radial braiding machine (1), this is removed in the direction of the rotation symmetry axis (8), and the fiber textile (7) thus formed is applied to the rim well core (4, 5) by means of draping. An inlay (9) in the form of a ring is subsequently mounted by means of positive-locking mounting onto the braided rim well core (4, 5). The inlay (9) images the partial contour of the rim well (21) from the well up to the wheel flange (22). After the mounting of the auxiliary core (6b), which is additionally used for fixing the inlay (9), the rim well core (4, 5), the inlay (9) and the auxiliary core (6b) are braided. After the braiding of the auxiliary core (6b), this is removed in the direction of the rotation symmetry axis (8), and the tube-shaped fiber textile (7) thus formed is applied to the inlay (9) and the rim well core (4, 5) by means of draping. Consequently, the inlay (9) is completely enclosed by the fiber textile (7). A multipart metallic outer mold is used in the area of the rim well (21) and wheel disk (23) for the pressing of the textile layers during the consolidation.

In another embodiment shown in FIGS. 8, 9, 10, 11, 12 and 13, the wheel disk (23) is formed by braiding a cylindrical mold part, which is used as the auxiliary core (6b). For this, at first, an inlay (9) is mounted by means of positive-locking mounting on the rim well core (4, 5). The inlay (9) images the partial contour of the rim well (21) from the well up to the wheel flange (22) and is designed as a lost core in the form of a ring or for a removal from the mold after the consolidation from metal ring segments (10). After the mounting of the auxiliary core (6b), which is additionally used for fixing the inlay (9) or the ring segments (10), the textile preforming is carried out by means of the braiding process on a radial braiding machine (1). After the braiding of the auxiliary core (6b), this is removed in the direction of the rotation symmetry axis (8), and the fiber textile (7) thus formed is applied to the inlay (9) or to the ring segments (10) and the rim well core (5) by means of draping. A multipart metallic outer mold is used in the area of the rim well (21) and the wheel disk (23) for the pressing of the textile layers during the consolidation. The inlay (9) remains in the component (11) after the consolidation. On the other hand, the ring segments (10) are removed from the mold after consolidation. For this, the rim well core (4, 5) is removed in the direction of the rotation symmetry axis (8), whereupon the ring segments (10) are removed from the mold in the radial direction. For the pressing of the textile layers during the consolidation, a multipart metallic outer mold is used in the area of the rim well (21) and the wheel disk (23).

Figure 14:
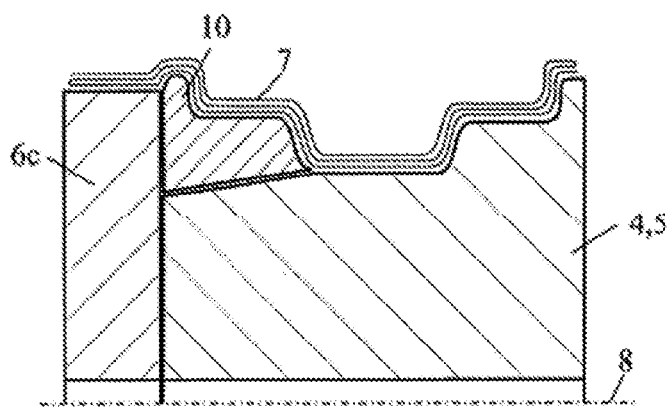
FIG. 14 is a view of layers of fiber material deposited in a positive-locking manner on a multipart core mold, consisting of an inner and an outer rim well core and a cylindrical auxiliary core.
Figure 15:
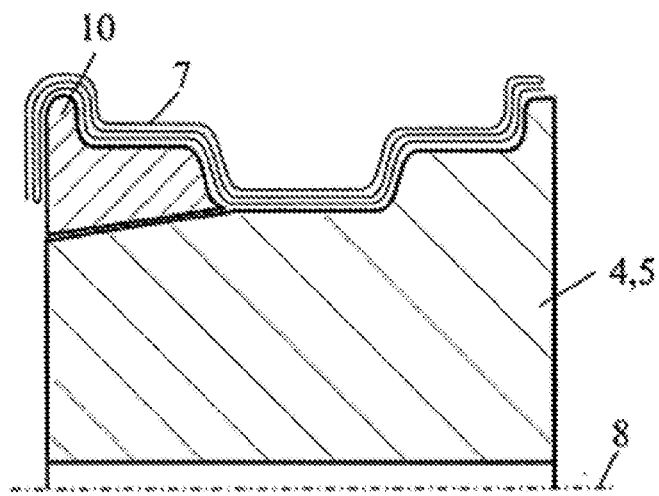
FIG. 15 is a view of the inner and outer rim well core with a layer of fiber material deposited thereon in a positive-locking manner and formed in one piece therewith.
Figure 16:
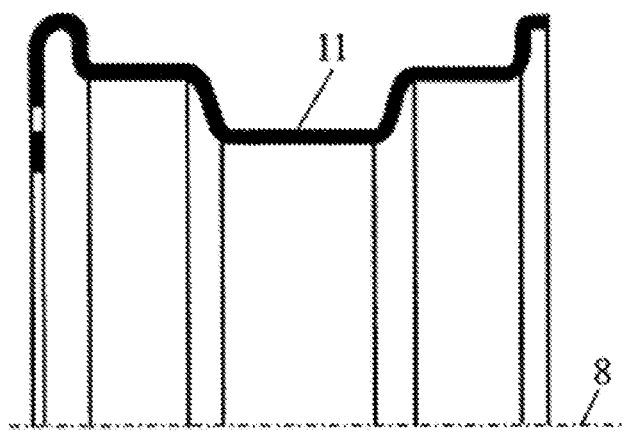
FIG. 16 is a cross sectional view of a rim profile, comprising a rim well and a flange.

In yet another embodiment shown in FIGS. 14, 15 and 16, a wheel disk projection is formed for mounting a wheel spider (25) or a wheel disk (23) by means of the braiding of a cylindrical mold part, which is used as the auxiliary core (6c). Metallic ring segments (10) here image the partial contour of the rim well from the well to the wheel flange. After the mounting of the auxiliary core (6c), which is additionally used for fixing the ring segments (10), the textile preforming is carried out by means of the braiding process on a radial braiding machine (1). After the braiding of the auxiliary core (6c), this is removed in the direction of the rotation symmetry axis (8) and the fiber textile (7) thus formed is applied to the ring segments (10) by means of draping. A multipart metallic outer mold is used in the area of the rim well (21) and the wheel disk (23) for the pressing of the textile layers during the consolidation. The ring segments (10) are removed from the mold after the consolidation. For this, the rim well core (5) is removed in the direction of the rotation symmetry axis (8), whereupon the ring segments (10) are removed from the mold in the radial direction.

Figure 17:
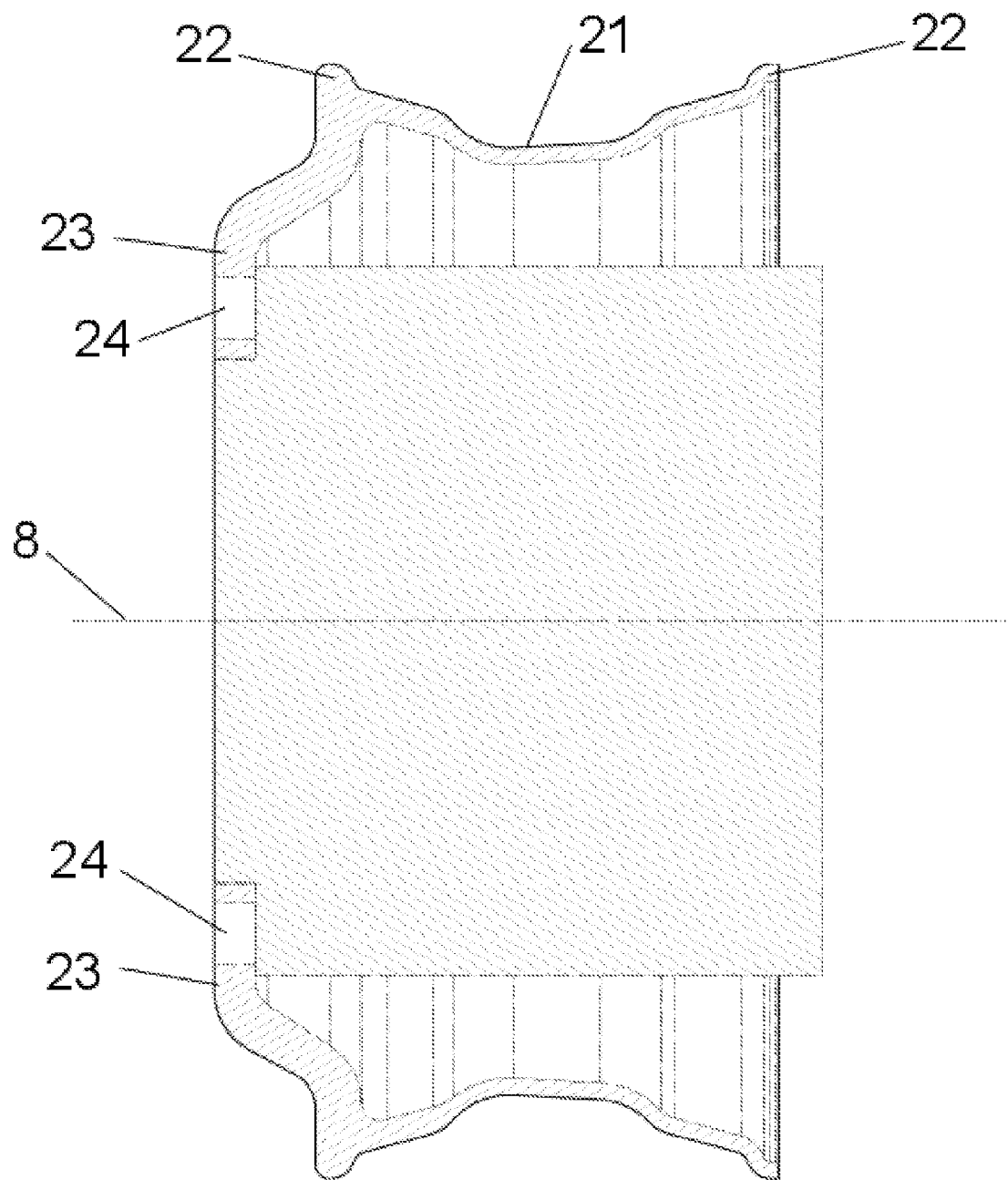
FIG. 17 is a cross sectional view of a rim profile showing the rotational axis, the wheel flanges, the rim well and the wheel disc with bolt holes.

FIG. 17 is a cross sectional view of a rim profile showing the rotational axis (8), the wheel flanges 22, the rim well 21 and the wheel disc 23 with bolt holes 24.

Figure 18:
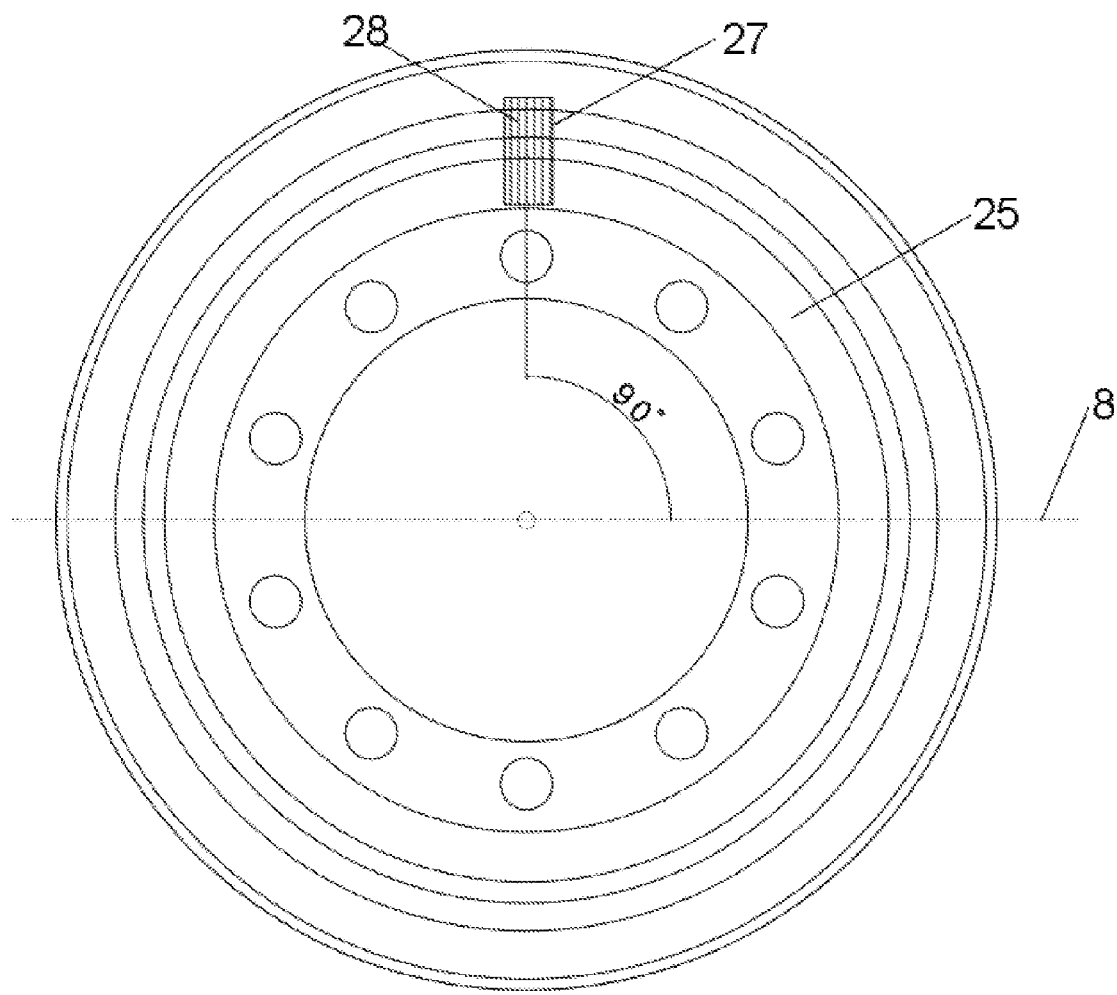
FIG. 18 is a front view of the wheel with a schematic display area where the fibers in the wheel disc are oriented in an angle of 90° in relation to the axis of rotation are schematically shown.

FIG. 18 is a front view of the wheel with a schematic display area (27) where the fibers (28) in the wheel disc (23) are oriented in an angle of 90° in relation to the axis of rotation (8) are schematically shown. Axis of rotation (8) of the wheel is tilted in the layer of the drawing for better understanding. Also shown is the wheel spider (25).

Figure 19:
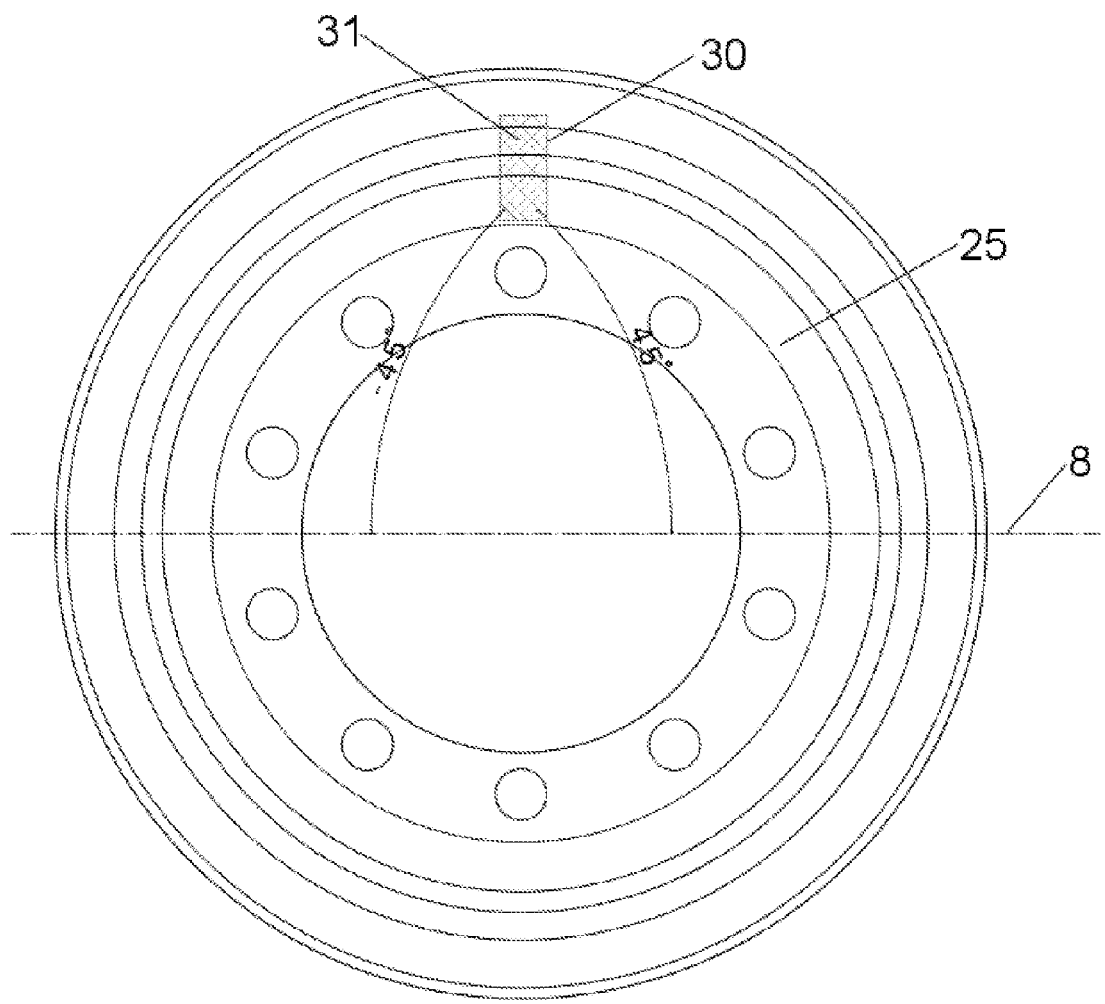
FIG. 19 is a front view of the wheel with a schematic display area where the angles of the fibers in the wheel disc are schematically shown.

FIG. 19 is a front view of the wheel with a schematic display area (30) where the angles of the fibers (31) in the wheel disc (23) are schematically shown. The angles are 45° and −45° in relation to the axis of rotation (8) of the wheel. Axis of rotation of the wheel is tilted in the layer of the drawing for better understanding. Also shown is the wheel spider (25).

Figure 20:
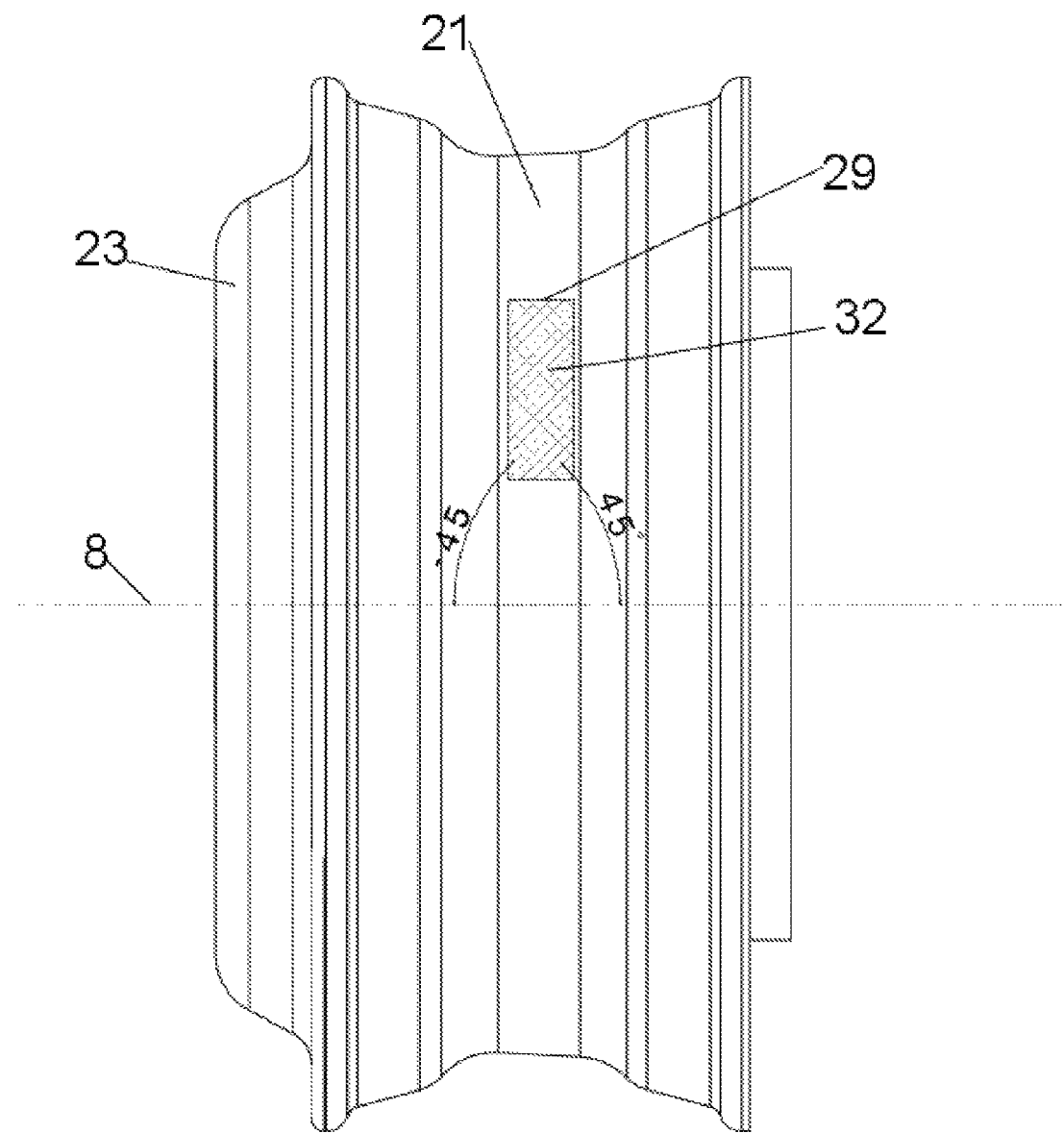
FIG. 20 is a side view of the wheel with a schematic display area where the angles of the fibers are schematically shown.

FIG. 20 is a side view of the wheel with a schematic display area (29) where the angles of the fibers (32) are schematically shown. In the shown area of the rim well the angles of the fibers are 45° and −45° in relation to the axis of rotation (8) of the wheel. Also shown is the wheel disc (23).

While specific embodiments of the invention have been shown and described in detail to illustrate the application of the principles of the invention, it will be understood that the invention may be embodied otherwise without departing from such principles.

What is claimed is:

1. A process for manufacture of a wheel made of fiber composite, the process comprising the following process steps:
   providing two wheel flanges, a rim well arranged between said two wheel flanges and a wheel disk passing over into at least one of said wheel flanges;
   preparing a core mold, having a cylinder-like rim well core and a cylindrical auxiliary core connected in an axial direction and detachably connected with the rim well core, whereby a shape of the rim well core corresponds to a shape of the rim well, said wheel flanges and an outer area of the wheel disk, and the rim well core is shaped, such that said rim well core can be removed after consolidation of the wheel;
   depositing at least one layer of fiber material on the core mold, so that a tube of fiber material lies on the core mold and the wheel flanges;
   removing the auxiliary core from the tube made of fiber material deposited thereon;
   bending over of the fiber material that is previously deposited on the auxiliary core, and applying said fiber material to a face of the rim well core;
   consolidating the fiber material with a matrix material in a consolidation mold; and
   removing the wheel from the consolidation mold.

2. A process in accordance with claim 1, wherein:
   in depositing said at least one layer of fiber material on the core mold, a binder is additionally added to the fiber material during depositing said at least one layer of fiber material on the core mold, and said binder is activated after depositing said fibers and pre-consolidates the fiber material; and
   the core mold is removed after pre-consolidating the fiber material.

3. A process in accordance with claim 1, wherein:
   the fiber material is inserted with the core mold into the consolidation mold; and
   the core mold is removed from the mold after consolidating the fiber material.

4. A process for the manufacture of a wheel made of fiber composite in accordance with claim 1, wherein the rim well core has a segmented structure for guaranteeing removability.

5. A process in accordance with claim 1, wherein the rim well core is one or more of
   designed as inflatable or fillable with a fluid in an undercut area of the at least one of the wheel flanges;
   designed as elastic and stabilizable by means of an extractable, rigid inner ring in the undercut area of the at least one of the wheel flanges; and a two-part design, whereby one part of the rim well core remains as a lost core in the wheel, or is removable.

6. A process for the manufacture of a wheel made of fiber composite in accordance with claim 5, wherein a removable part of the rim well core can be shrunk or dissolved due to action of a medium or heat.

7. A process for the manufacture of a wheel made of fiber composite in accordance with claim 1, wherein the rim well core has a multipart design, whereby a first part of the rim well core images an area from a first wheel flange in a direction towards a rim center and a second, lost part, of the rim well core images a remaining area of the rim well, whereby in depositing said at least one layer of fiber material on the core mold comprises deposition of fibers first taking place on the first part of the rim well core and a contact surface of said rim well core to the second part of the rim well core, subsequently the second part of the rim well core and the auxiliary core at the first part of the rim well core and said second part of the rim well core is applied to the fiber material applied at said first part of the rim well core, and subsequently fibers are deposited on the second part of the rim well core and the auxiliary core.

8. A process for the manufacture of a wheel made of fiber composite in accordance with claim 1, wherein fiber deposition takes place as braiding, winding or a braiding process or by means of deposition of prepregs.

9. A process for the manufacture of a wheel made of fiber composite in accordance with claim 1, wherein continuous fibers of the fiber layer in an area of the rim well have a fiber angle of ±20° to ±75° in relation to an axis of rotation of the wheel.

10. A process for the manufacture of a wheel made of fiber composite in accordance with claim 1, wherein continuous fibers of the fiber layer in an area of the rim well have a fiber angle of ±30° to ±70° in relation to an axis of rotation of the wheel.

11. A process for manufacture of a wheel made of fiber composite, the process comprising the following process steps:
providing two wheel flanges;
providing a rim well arranged between said two wheel flanges;
forming a wheel disk at least partly by means of fiber layers, which extend, without interruption, from the rim well over the at least one of the wheel flanges into the wheel disk.

12. A process for the manufacture of a wheel made of fiber composite in accordance with claim 11, wherein said two wheel flanges, said rim wheel and said wheel disk form a wheel structure, wherein a portion of each of said fiber layers extends in a radial direction relative to a longitudinal axis of said wheel structure and another portion of each of said fiber layers extends parallel to said longitudinal axis.

13. A process for the manufacture of a wheel made of fiber composite in accordance with claim 11, wherein continuous fibers of the fiber layers in an area of the rim well have a fiber angle of ±3° to ±87° in relation to an axis of rotation of the wheel.

14. A process for the manufacture of a wheel made of fiber composite in accordance with claim 11, wherein continuous fibers of the fiber layers in an area of the wheel disk have a fiber angle of ±3° to ±87° in relation to a radial direction of the wheel.

15. A process for the manufacture of a wheel made of fiber composite in accordance with claim 11, wherein continuous fibers of the fiber layers in an area of the rim well have a fiber angle of ±20° to ±75° in relation to an axis of rotation of the wheel.

16. A process for the manufacture of a wheel made of fiber composite in accordance with claim 11, wherein continuous fibers of the fiber layers in an area of the rim well have a fiber angle of ±30° to ±70° in relation to an axis of rotation of the wheel.

17. A process for the manufacture of a wheel made of fiber composite in accordance with claim 11, wherein said fiber layers are embedded in duro- or thermoplastic matrix material.

18. A process for manufacture of a wheel made of fiber composite, the process comprising the following process steps:
forming a wheel structure, said wheel structure comprising a longitudinal axis, two wheel flanges, a wheel disk and a rim well arranged between said two wheel flanges, at least said wheel disk and said rim well comprising fiber layers, said fiber layers extending continuously, without interruption, from said rim well over at least one of said two wheel flanges to said wheel disk, wherein a portion of each of said fiber layers extends in a radial direction relative to said longitudinal axis of said wheel structure and another portion of each of said fiber layers extends parallel to said longitudinal axis.

19. A process for the manufacture of a wheel made of fiber composite in accordance with claim 18, wherein said fiber layers are embedded in duro- or thermoplastic matrix material, wherein continuous fibers of the fiber layers in an area of the rim well have a fiber angle of ±20° to ±75° in relation to an axis of rotation of the wheel structure.

20. A process for the manufacture of a wheel made of fiber composite in accordance with claim 18, wherein continuous fibers of the fiber layers in an area of the wheel disk have a fiber angle of ±3° to ±87° in relation to a radial direction of the wheel structure.

* * * * *